(12) United States Patent
Kucharski et al.

(10) Patent No.: US 10,769,439 B2
(45) Date of Patent: Sep. 8, 2020

(54) SYSTEM AND METHOD FOR FIXED CAMERA AND UNMANNED MOBILE DEVICE COLLABORATION TO IMPROVE IDENTIFICATION CERTAINTY OF AN OBJECT

(71) Applicant: MOTOROLA SOLUTIONS, INC, Chicago, IL (US)

(72) Inventors: Wojciech Jan Kucharski, Rzeszow (PL); Pawel Jurzak, Cracow (PL); Grzegorz Kaplita, Rzeszow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 107 days.

(21) Appl. No.: 16/308,514

(22) PCT Filed: Sep. 16, 2016

(86) PCT No.: PCT/PL2016/050040
§ 371 (c)(1),
(2) Date: Dec. 10, 2018

(87) PCT Pub. No.: WO2018/052323
PCT Pub. Date: Mar. 22, 2018

(65) Prior Publication Data
US 2019/0156121 A1 May 23, 2019

(51) Int. Cl.
*G06K 9/00* (2006.01)
*B64C 39/02* (2006.01)
*G01C 21/20* (2006.01)

(52) U.S. Cl.
CPC ........ *G06K 9/00671* (2013.01); *B64C 39/024* (2013.01); *G01C 21/20* (2013.01);
(Continued)

(58) Field of Classification Search
CPC .......... G06K 9/00671; G06K 9/00771; G06K 9/00785; G06K 9/00791; G06K 9/00798;
(Continued)

(56) References Cited

U.S. PATENT DOCUMENTS

| 7,346,184 B1 | 3/2008 | Carr et al. ............... 382/100 |
| 8,615,113 B2 | 12/2013 | Lee et al. ............... 382/118 |

(Continued)

FOREIGN PATENT DOCUMENTS

WO 2017164753 A1 9/2017 ........... G08B 13/196

OTHER PUBLICATIONS

Wang Xiaogang Ed—Calderara Simone et al.: "Intelligent multi-camera video surveillance: A review", Patterns Recognition Letters, vol. 34, No. 1, 2013, pp. 3-19, all pages.
(Continued)

*Primary Examiner* — Andrew W Johns
(74) *Attorney, Agent, or Firm* — Daniel R. Bestor (57) ABSTRACT

A process for fixed camera and unmanned mobile device collaboration is disclosed in order to improve identification of an object of interest. A first point of view (POV) of a captured object is obtained and it is determined, with a first level of certainty, that the captured first POV of the object matches a stored object of interest. A dispatch instruction and intercept information is then wirelessly broadcast for receipt by camera-equipped unmanned mobile vehicles within a broadcast range for identifying and intercepting the object. Subsequently, a captured second POV of the first captured object is received via the one or more camera-equipped unmanned mobile vehicles. The captured second POV of the captured object is used to determine, with a second level of certainty, that the captured object matches the stored object of interest.

20 Claims, 6 Drawing Sheets

(52) U.S. Cl.
CPC ........... *G06K 9/00* (2013.01); *G06K 9/00771* (2013.01); *G06K 9/00785* (2013.01); *G06K 9/00798* (2013.01); *B64C 2201/042* (2013.01); *B64C 2201/127* (2013.01)

(58) Field of Classification Search
CPC ............. G06T 7/70; G06T 2207/30201; G06T 2207/30232; G06T 2207/30236; G06T 2207/30348; G01C 21/20; B64C 39/024; B64C 2201/123; B64C 2201/127
See application file for complete search history.

(56) References Cited

U.S. PATENT DOCUMENTS

| | | | |
|---|---|---|---|
| 9,165,369 B1 | 10/2015 | Zhang et al. | G06T 7/0081 |
| 9,237,307 B1* | 1/2016 | Vendrow | H04N 7/152 |
| 2012/0287274 A1 | 11/2012 | Bevirt | 348/144 |
| 2012/0307042 A1 | 12/2012 | Lee et al. | 348/114 |
| 2014/0063249 A1 | 3/2014 | Miller et al. | 348/148 |
| 2015/0244790 A1 | 8/2015 | Zavesky et al. | H04L 67/104 |
| 2015/0268058 A1 | 9/2015 | Samarasekera et al. | G01C 21/3673 |
| 2017/0059692 A1* | 3/2017 | Laufer et al. | F41G 7/2253 |
| 2017/0195627 A1* | 7/2017 | Sham | H04B 7/18506 |

OTHER PUBLICATIONS

The International Search Report and the Written Opinion, corresponding patent serial No. PCT/PL2016/050040 filed Sep. 16, 2016, all pages.

* cited by examiner

STRAIGHT ON VIEW
602

PROFILE VIEW
604

THREE QUARTERS VIEW
606

*FIG. 6*

SYSTEM AND METHOD FOR FIXED CAMERA AND UNMANNED MOBILE DEVICE COLLABORATION TO IMPROVE IDENTIFICATION CERTAINTY OF AN OBJECT

This application is a National Stage filing under 35 USC § 371 of co-pending Patent Cooperation Treaty international application having Serial No. PCT/PL2016/050040 (the 'PCT international application') filed on Sep. 16, 2016. This application claims priority to the PCT international application, the entire contents of which are incorporated herein by reference.

BACKGROUND OF THE INVENTION

As the number of fixed cameras available and accessible across urban and suburban areas increases, the opportunity and ability to identify objects relative to objects of interest in real-time correspondingly increases as well. Using digital image processing, particular objects can be identified relative to objects of interest with a corresponding level of certainty or confidence. In situations where the level of certainty is relatively high that an image-captured object matches an object of interest, such as ninety to one hundred percent, it becomes relatively easy to make corresponding decisions based on the match. Similarly, in situations where the level of certainty is relatively low, such as zero to ten percent, it similarly becomes relatively easy to refrain from making corresponding decisions based on the lack of match. However, there is an area in-between the relatively high and relatively low levels of certainty, such as between ten and ninety percent or twenty and eighty percent certain, where it becomes more difficulty to make corresponding decisions based on such intermediate levels of certainty that an image-captured object matches an object of interest.

Thus, there exists a need for an improved technical method, device, and system for improving object recognition levels of certainty of objects imaged by fixed cameras through intelligent dispatch and coordination between the fixed cameras and one or more camera-equipped unmanned mobile vehicles.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved technical method, device, and system for improving object recognition certainty of objects imaged by fixed cameras through intelligent dispatch and coordination between fixed cameras and identified camera-equipped unmanned mobile vehicles.

In one embodiment, a process for fixed camera and unmanned mobile device collaboration to improve identification of an object of interest includes: receiving, at an electronic processing device from a fixed camera, a captured first point of view of a first captured object and determining, with a first level of certainty in a predetermined level of certainty range, that the captured first point of view of the first object matches a first stored object of interest; causing, by the electronic processing device, a dispatch instruction and intercept information to be wirelessly broadcast for receipt by one or more camera-equipped unmanned mobile vehicles within broadcast range, the intercept information including the determined direction of travel of the first captured object, information sufficient to identify either the first captured object or a vehicle with which the first captured object is travelling, and information identifying a desired second point of view of the first captured object different from the first point of view; wirelessly receiving, by the electronic processing device, via the one or more camera-equipped unmanned mobile vehicles, a captured second point of view of the first captured object; and using, by the electronic processing device, the captured second point of view of the first captured object to determine, with a second level of certainty, that the first captured object matches the stored object of interest.

In a further embodiment, an electronic processing device for fixed camera and unmanned mobile device collaboration to improve identification of an object of interest includes: a fixed-camera interface; an unmanned mobile device interface; a memory; a transceiver; and one or more processors configured to: receive, via the fixed-camera interface and from a fixed camera, a captured first point of view of a first captured object and determining, with a first level of certainty in a predetermined level of certainty range, that the captured first point of view of the first object matches a first stored object of interest; causing a dispatch instruction and intercept information to be wirelessly broadcast, via the transceiver, for receipt by one or more camera-equipped unmanned mobile vehicles within broadcast range, the intercept information including the determined direction of travel of the first captured object, information sufficient to identify either the first captured object or a vehicle with which the first captured object is travelling, and information identifying a desired second point of view of the first captured object different from the first point of view; wirelessly receive, via the transceiver and from the one or more camera-equipped unmanned mobile vehicles, a captured second point of view of the first captured object; and use the captured second point of view of the first captured object to determine, with a second level of certainty, that the first captured object matches the stored object of interest.

Each of the above-mentioned embodiments will be discussed in more detail below, starting with example communication system and device architectures of the system in which the embodiments may be practiced, followed by an illustration of processing steps for achieving an improved method, device, and system for improving object recognition certainty of objects imaged by fixed cameras through intelligent dispatch and coordination between fixed cameras and identified camera-equipped unmanned mobile vehicles. Further advantages and features consistent with this disclosure will be set forth in the following detailed description, with reference to the figures.

1. COMMUNICATION SYSTEM AND DEVICE STRUCTURES

Figure 1:
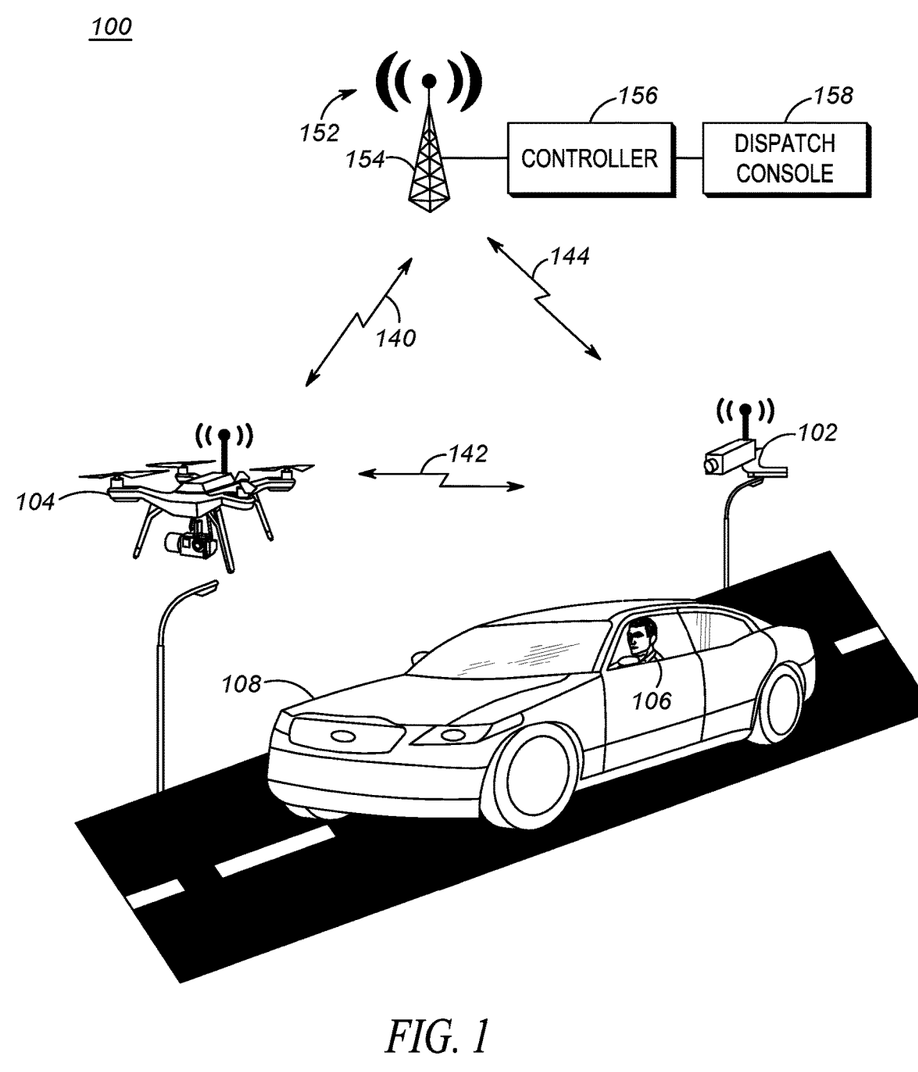
FIG. 1 is a system diagram illustrating an example operating environment for improving object recognition certainty of objects imaged by fixed cameras through intelligent dispatch and coordination between fixed cameras and camera-equipped unmanned mobile vehicles, in accordance with an embodiment.

Referring now to the drawings, and in particular FIG. 1, an example communication system diagram illustrates a system 100 including a first fixed video camera 102, a first camera-equipped unmanned mobile vehicle 104, and a first object 106 for capture in a first vehicle 108. Each of the first fixed video camera 102 and the first camera-equipped unmanned mobile vehicle 104 may be capable of directly wirelessly communicating via a direct-mode wireless link 142 or a wired link, and/or may be capable of wirelessly communicating via a wireless infrastructure radio access network (RAN) 152 over respective wireless infrastructure links 140, 144.

The fixed video camera 102 may be any imaging device capable of taking still or moving-image captures in a corresponding area of interest, illustrated in FIG. 1 as a road, but in other embodiments, may include a building entryway, a bridge, a sidewalk, or some other area of interest. The fixed video camera 102 is fixed in the sense that it cannot physically move itself in any significant direction (e.g., more than one foot or one inch in any horizontal or vertical direction). However, this does not mean that it cannot pan, tilt, or zoom at its fixed location to cover a larger corresponding area of interest than without such pan, tilt, or zoom. The fixed video camera 102 may be continuously on, may periodically take images at a regular cadence, or may be trigged to begin capturing images and/or video as a result of some other action, such as motion detected in the corresponding area of interest by a separate motion detector device communicatively coupled to the fixed video camera 102. The fixed video camera 102 may include a CMOS or CCD imager, for example, for digitally capturing images and/or video of a corresponding area of interest. Images and/or video captured at the fixed video camera 102 may be stored at the fixed video camera 102 itself, and/or may be transmitted to a separate storage or processing device via direct-mode wireless link 142 and/or RAN 152. While fixed video camera 102 is illustrated in FIG. 1 as affixed to a street light or street pole, in other embodiments, the fixed video camera 102 may be affixed to a building, a stop light, a street sign, or some other structure.

The first camera-equipped unmanned mobile vehicle 104 may be a camera-equipped flight-capable airborne drone having an electro-mechanical drive element, an imaging camera, and a microprocessor that is capable of taking flight under its own control, under control of a remote operator, or some combination thereof, and taking images and/or video of a region of interest prior to, during, or after flight. The imaging camera attached to the unmanned mobile vehicle 104 may be fixed in its direction (and thus rely upon repositioning of the mobile vehicle 104 it is attached to for camera positioning) or may include a pan, tilt, zoom motor for independently controlling pan, tilt, and zoom features of the imaging camera. The first camera-equipped unmanned mobile vehicle 104, while depicted in FIG. 1 as an airborne drone, could additionally or alternatively be a ground-based or water-based mobile vehicle, among many other possibilities. The imaging camera attached to the unmanned mobile vehicle 104 may be continuously on, may periodically take images at a regular cadence, or may be trigged to begin capturing images and/or video as a result of some other action, such as the unmanned mobile vehicle 104 being dispatched to a particular area of interest or dispatched with instructions to intercept a certain type of person, vehicle, or object. The imaging camera may include a CMOS or CCD imager, for example, for digitally capturing images and/or video of the corresponding region of interest, person, vehicle, or object of interest. Images and/or video captured at the imaging camera may be stored at the unmanned mobile vehicle 104 itself and/or may be transmitted to a separate storage or processing device via direct-mode wireless link 142 and/or RAN 152. While unmanned mobile vehicle 104 is illustrated in FIG. 1 as being temporarily positioned at a street light or street pole (perhaps functioning as a charging station to charge a battery in the unmanned mobile vehicle 104 while it is not in flight), in other embodiments, the unmanned mobile vehicle 104 may be positioned atop a building, atop a stop light, or some other structure.

Infrastructure RAN 152 may implement over wireless links 140, 144 a conventional or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, infrastructure RAN 152 may additionally or alternatively implement over wireless links 140, 144 a Long Term Evolution (LTE) protocol including multimedia broadcast multicast services (MBMS), an open mobile alliance (OMA) push to talk (PTT) over cellular (OMA-PoC) standard, a voice over IP (VoIP) standard, or a PTT over IP (PoIP) standard. In still further embodiments, infrastructure RAN 152 may additionally or alternatively implement over wireless links 140, 144 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well. The infrastructure RAN 152 is illustrated in FIG. 1 as providing coverage for the fixed camera 102 and the unmanned mobile vehicle 104 via a single fixed terminal 154 coupled to a controller 156 (e.g., radio controller, call controller, PTT server, zone controller, MME, BSC, MSC, site controller, Push-to-Talk controller, or other network device) and including a dispatch console 158 operated by a dispatcher. In other embodiments, more or different types of fixed terminals may provide RAN services to the fixed camera 102 and the unmanned mobile vehicle 104 and may or may not contain a separate controller 156 and/or dispatch console 158.

The first object 106 for capture is illustrated in FIG. 1 as a facial profile of a driver of vehicle 108. The fixed camera 102 may obtain a first image and/or video capture of the first object 106 as the vehicle 108 passes by the fixed camera 102. However, the first image and/or video capture may be only one point of view (POV, such as profile, straight-on, or three-quarters) and may be only a partial capture at that (e.g., due to interfering objects such as other cars, people, or traffic items, or due to reflections or weather, among other potential interferers). These limitations may lead a computing device processing the first image or video capture and attempting to match an object in the first image and/or video capture against a first stored object of interest with a lower level of certainty than absolute certainty (e.g., less than 100%, less than 90%, less than 80 or 70% or 60%). Additionally, the computing device processing the first image and/or video capture may match the first object in the first image and/or video capture against the first stored object of interest with a higher level of certainty than absolute uncertainty (e.g., greater than 0%, or great than 10% or 20%, or greater than 30% or 40%). Within these various ranges of less than absolutely certainty and greater than absolute uncertainty, it would be helpful to obtain a second POV or less obstructed POV of the first object via coordination or collaboration with the unmanned mobile vehicle 104 in order to determine, with a greater level of certainty, whether the first object matches the object of interest.

Figure 3:
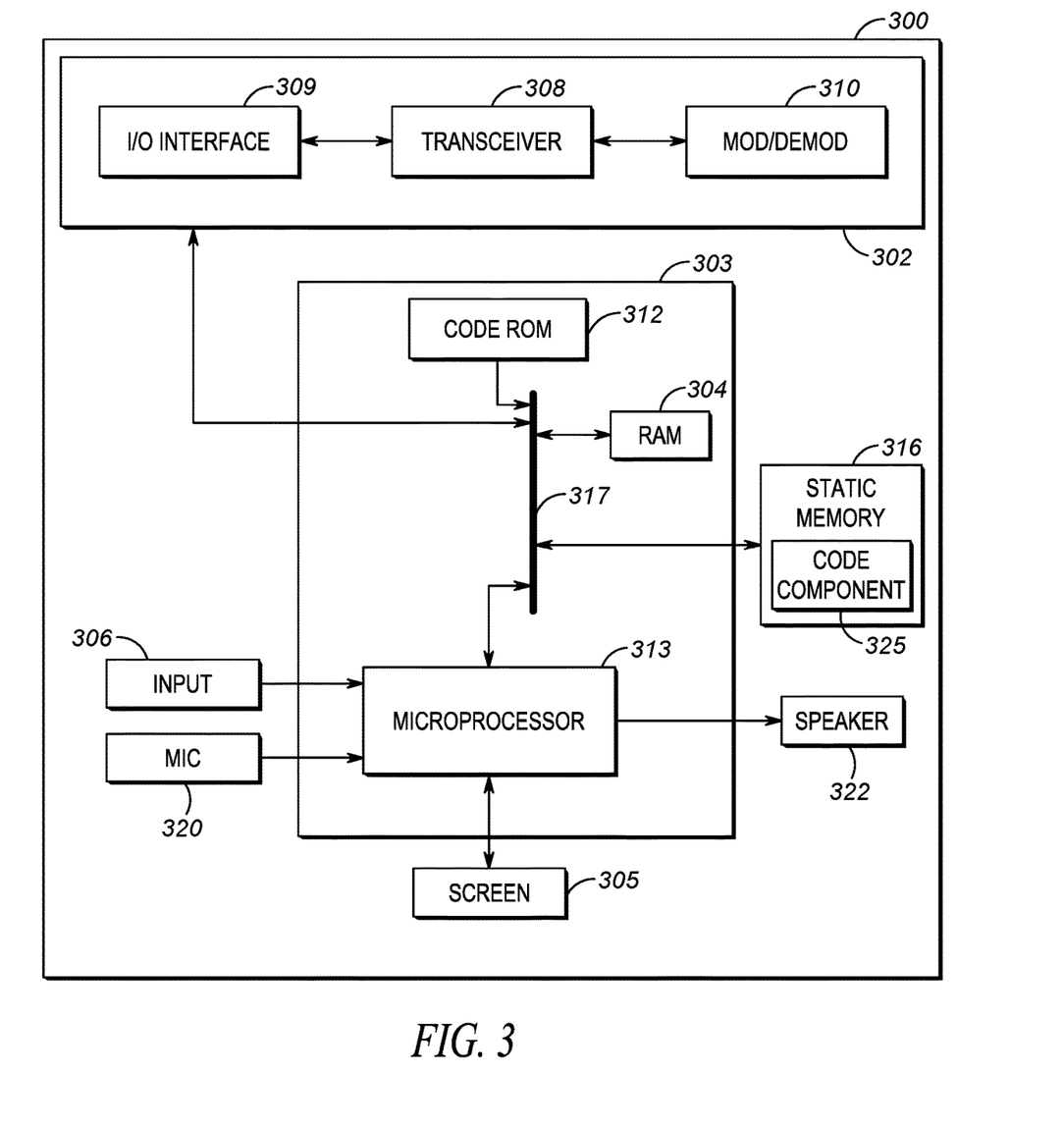
FIG. 3 is a device diagram showing a device structure of a computing device for improving object recognition certainty of objects of interest imaged by fixed cameras through intelligent dispatch and coordination between fixed cameras and camera-equipped unmanned mobile vehicles, in accordance with an embodiment.
Figure 4:
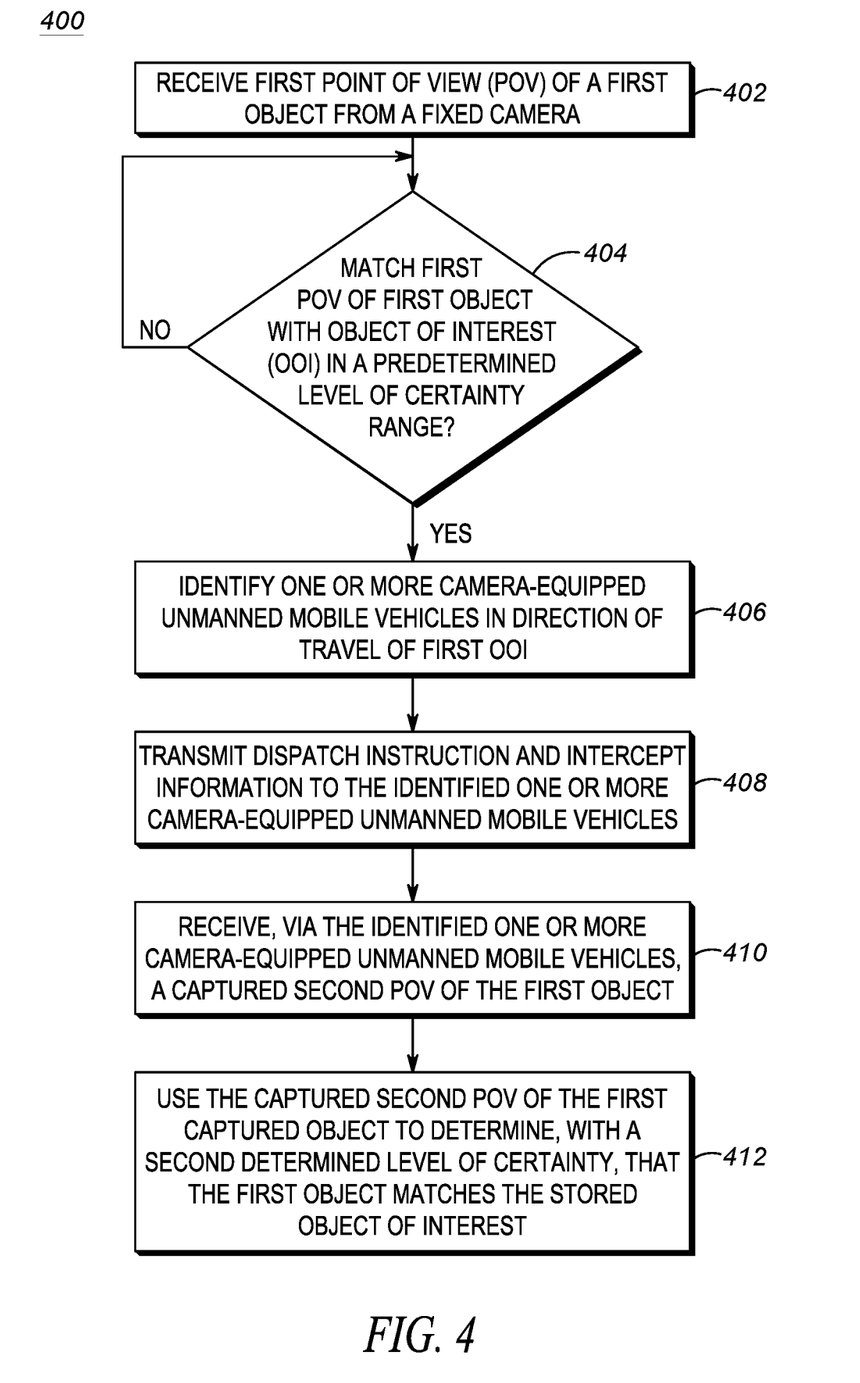
FIG. 4 illustrates a flow chart setting forth process steps for operating a computing device of FIG. 3 to improve object recognition certainty of objects imaged by fixed cameras through intelligent dispatch and coordination between fixed cameras and camera-equipped unmanned mobile vehicles, in accordance with an embodiment.

Advantageously, and in accordance with FIGS. 3 and 4, the fixed camera 102 and the unmanned mobile vehicle 104 (among other potential camera-equipped unmanned mobile vehicles not illustrated in FIG. 1) may collaborate or coordinate to obtain a second POV image and/or video capture of the object and obtain a corresponding second certainty of a match.

Figure 2:
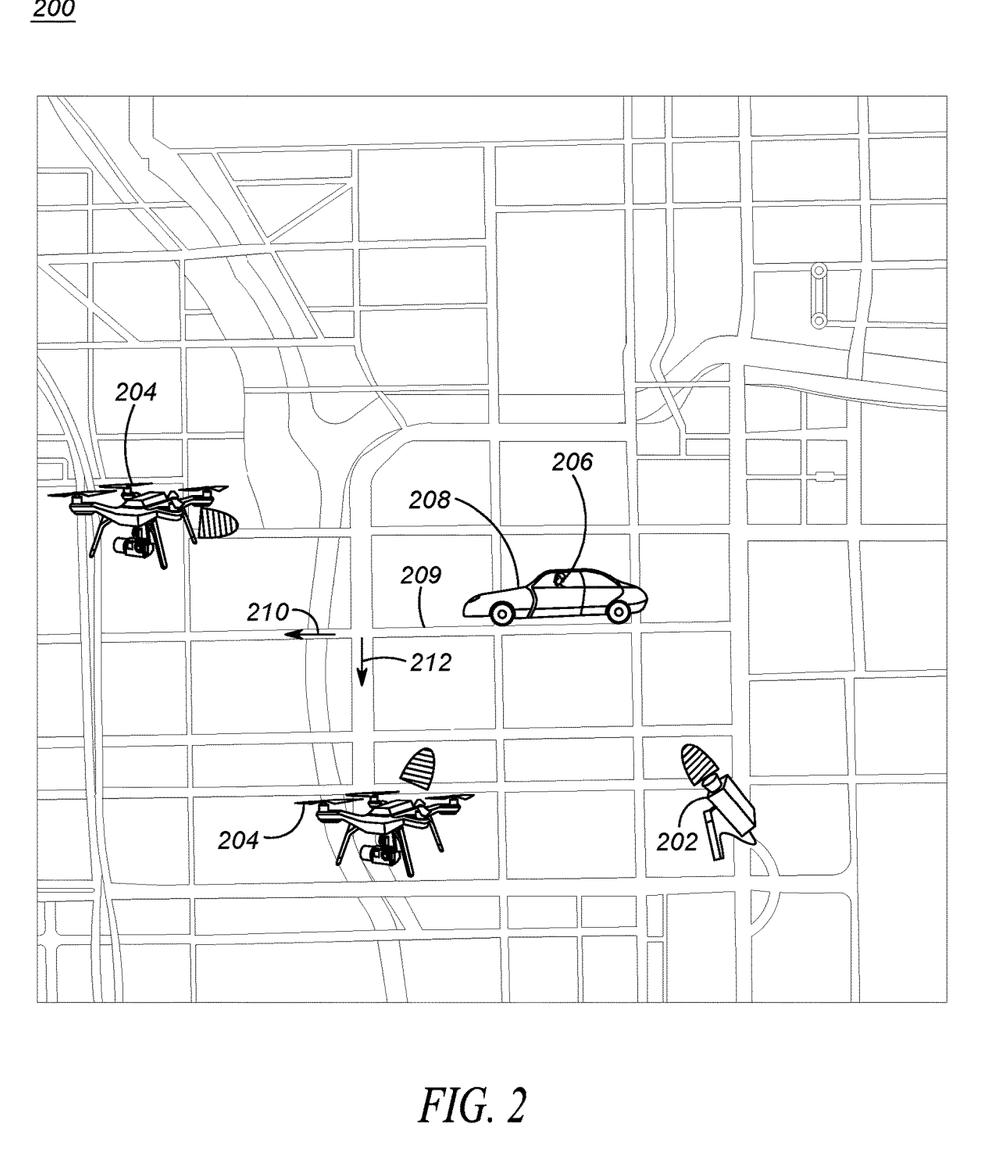
FIG. 2 is a plan diagram of a geographic area diagrammatically illustrating fixed camera and camera-equipped unmanned mobile vehicle positioning and coordination, in accordance with an embodiment.

Referring now to FIG. 2, an example plan diagram 200 illustrating fixed camera 202 and camera-equipped unmanned mobile vehicle 204 positioning and coordination relative to an underlying cartographic street map for capture of a second object 206 in a second vehicle 208. The fixed camera 202 may be the same or similar to the fixed camera 102 described with respect to FIG. 1 above, and the unmanned mobile vehicles 204 may be the same or similar to the unmanned mobile vehicle 104 described with respect to FIG. 1 above. The vehicle 208 is illustrated in FIG. 2 as traveling west along a street 209 when the fixed camera 202 captures a first image and/or video of the second object 206 in the second vehicle 208 and matches it against a stored object of interest with a first certainty less than absolute certainty but greater than absolute uncertainty. For example, the first image or video of the second object 206 may be a side-profile facial image capture of a driver. The first certainty may be a certainty of less than 90%, or less than 80 or 70%, but greater than 10%, or greater than 20%, 30% or 40%.

In some embodiments, the level of certainty range within which the herein described collaboration or coordination may be triggered may vary based on metadata associated with the object of interest and stored accompanying the object of interest or separately retrievable from another database but linked to the object of interest. For example, a facial image object of interest associated with a person accused or convicted of a felony infraction may have an associated level of certainty range of 10% (or 20%) to 80% (or 70%) to trigger the herein described collaboration or coordination processes, while a facial image object of interest associated with a person accused or convicted of a misdemeanor infraction may have an associated level of certainty range of 35% (or 45%) to 85% (or 75%). In some embodiments, the disclosed technical processes may only be employed for certain types of infractions, such as felony infractions, and not at all for other types of infractions, such as misdemeanor infractions.

When a match is made with a certainty above the high end of the ranges set forth above, an officer or other responder may be automatically dispatched. In order to avoid dispatching an officer or otherwise alerting law enforcement or other responders with a less than certain match, but because there is a greater than absolute uncertainty of a match (0%), the fixed camera 202 or some other computing device processing the first image and/or video may cause a nearby camera-equipped unmanned mobile vehicle 204 to be dispatched to take a second point of view image capture of the second object 206 driver (preferably different than the first, such as three-quarters view or head-on, or perhaps un-obstructed side-profile compared to an obstructed first image or video). As illustrated in FIG. 2, the computing device may access a cartographic database of streets and determine, based on a detected direction of motion from the first image and/or video or as reported by some other sensor other than the fixed camera 202, identify one or more possible future paths 210, 212 that the second object 206 (and/or the vehicle 208 carrying the second object 206) is likely to take. In one example, the computing device may identify all possible paths and transmit, via a transceiver, a dispatch instruction (instructing the unmanned mobile vehicle to position itself to take a second image/video capture of the second object of interest, including any necessary power-up and/or movement off of its temporary charging platform) and intercept information (including information sufficient to identify the second object 206 and/or the vehicle 208 in which the second object 206 is traveling, such as including but not limited to, the first image and/or video of the second object, a location of the fixed camera 202, a make, model, and/or color of the vehicle in which the second object is traveling, a license plate associated with the vehicle in which the second object is traveling, a lane in which the vehicle is traveling, a status of any detected turn indicators associated with the vehicle, a desired type of second point of view desired (e.g., full-on, three-quarters, and/or profile), and/or other information necessary for or to aid in identifying the second object 206 and/or the vehicle 208).

In some embodiments, a computing device in the fixed camera 202, or a computing device in the RAN 152 of FIG. 1 (not pictured in FIG. 2) may sub-select from all possible future paths using intercept information provided by the fixed camera, such as a current driving lane or turn indicator of the vehicle 208, and sub-select less than all unmanned mobile vehicles 204 for dispatch. For example, if the vehicle's 208 left turn signal is on, the computing device may transmit the dispatch instruction and the intercept information to only the lower unmanned mobile vehicle 204 in FIG. 2 and not the upper unmanned mobile vehicle 204.

In still further embodiments, a computing device in or coupled to fixed camera 202 may wirelessly broadcast the dispatch instruction and intercept information for direct wireless receipt by one or more of the unmanned mobile vehicles 204 within broadcast range of the fixed camera 202. Those unmanned mobile vehicles 204 receiving the dispatch instruction and intercept information may then individually, or as a group, determine whether an which ones can intercept the second object and/or vehicle and may transmit an acknowledgment and response to the fixed camera including their current location and/or imaging parameters of their associated cameras (e.g., resolution, field of view, focal length, light sensitivity, etc.). The computing device could then determine which ones, or perhaps all, of the acknowledging unmanned mobile vehicles to confirm dispatch to intercept and take a second image and/or video of the second object based on geographic proximity (preferring closer to travel direction of second object and/or second vehicle) and/or imaging parameters (preferring improved/higher imaging parameters), among other possibilities.

Now referring to FIG. 3, a schematic diagram illustrates a computing device 300 according to some embodiments of the present disclosure. Computing device 300 may be, for example, embedded in fixed video camera 102, in a processing unit adjacent to fixed video camera 102 but communicatively coupled to fixed video camera 102, at a remote server device in the RAN 152 (such as at controller 156) accessible to fixed video camera 102 and unmanned mobile vehicle 104 via the RAN 152, at the unmanned mobile vehicle 104, or at some other network location. As shown in FIG. 3, computing device 300 includes a communications unit 302 coupled to a common data and address bus 317 of a processing unit 303. In some embodiments, the computing device 300 may also include an input unit (e.g., keypad, pointing device, touch-sensitive surface, etc.) 306 and a display screen 305, each coupled to be in communication with the processing unit 303.

A microphone 320 may be present for capturing audio at a same time as an image or video that is further encoded by processing unit 303 and transmitted as an audio/video stream data by communication unit 302 to other devices. A communications speaker 322 may be present for reproducing audio that is sent to the computing device 300 via the communication unit 302, or may be used to play back alert tones or other types of pre-recorded audio when a match is found to an object of interest, so as to alert nearby officers.

The processing unit 303 may include a code Read Only Memory (ROM) 312 coupled to the common data and address bus 317 for storing data for initializing system components. The processing unit 303 may further include a microprocessor 313 coupled, by the common data and address bus 317, to a Random Access Memory (RAM) 304 and a static memory 316.

The communications unit 302 may include one or more wired or wireless input/output (I/O) interfaces 309 that are configurable to communicate with other devices, such as a portable radio, tablet, wireless RAN, and/or vehicular transceiver.

The communications unit 302 may include one or more wireless transceivers 308, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or other similar type of wireless transceiver configurable to communicate via a wireless radio network. The communications unit 302 may additionally or alternatively include one or more wireline transceivers 308, such as an Ethernet transceiver, a Universal Serial Bus (USB) transceiver, or similar transceiver configurable to communicate via a twisted pair wire, a coaxial cable, a fiber-optic link, or a similar physical connection to a wireline network. The transceiver 308 is also coupled to a combined modulator/demodulator 310.

The microprocessor 313 has ports for coupling to the input unit 306 and the microphone unit 320, and to the display screen 305 and speaker 322. Static memory 316 may store operating code 325 for the microprocessor 313 that, when executed, performs one or more of the computing device steps set forth in FIG. 4 and accompanying text and/or FIG. 5 and accompanying text.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

2. PROCESSES FOR IMPROVING OBJECT RECOGNITION CERTAINTY OF OBJECTS COMPARED TO OBJECTS OF INTEREST VIA FIXED AND CAMERA-EQUIPPED UNMANNED MOBILE VEHICLE COORDINATION

Figure 5:
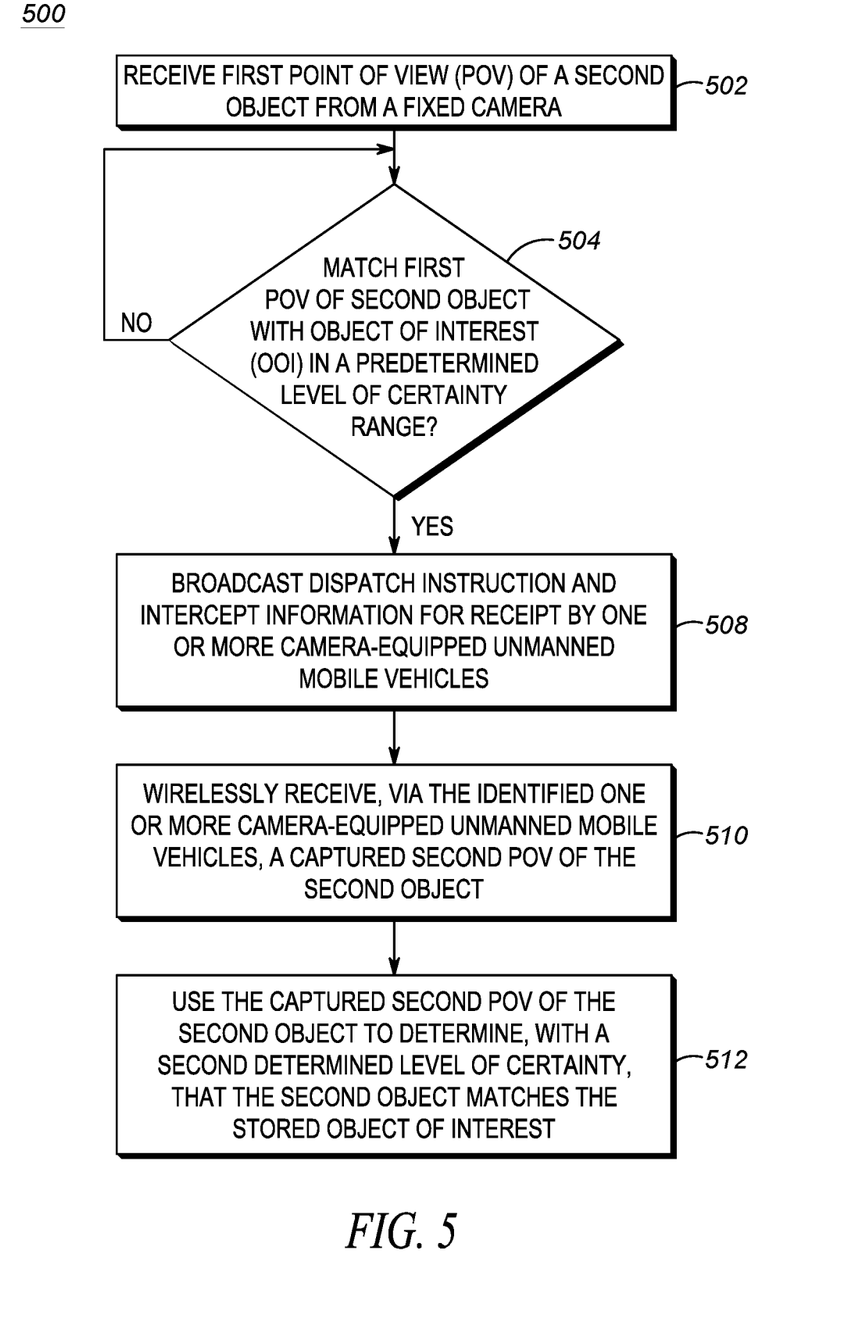
FIG. 5 illustrates a flow chart setting forth process steps for operating a distributed system of fixed cameras and camera-equipped unmanned mobile vehicles to improve object recognition certainty of objects imaged by fixed cameras, in accordance with an embodiment.

Turning now to FIGS. 4 and 5, flow chart diagrams illustrate methods 400 and 500 for improving object recognition level of certainty of objects compared to objects of interest via fixed and camera-equipped unmanned mobile vehicle coordination. While a particular order of processing steps, message receptions, and/or message transmissions is indicated in FIGS. 4 and 5 for exemplary purposes, timing and ordering of such steps, receptions, and transmissions may vary where appropriate without negating the purpose and advantages of the examples set forth in detail throughout the remainder of this disclosure. A corresponding computing device, such as that set forth in FIG. 3 above, may execute method 400 and/or 500 at power-on, at some predetermined time period thereafter, in response to a trigger raised locally at the device via an internal process or in response to a trigger generated external to the computing device and received via an input interface, among other possibilities. In particular, method 400 describes a process for improving object recognition certainty of objects compared to objects of interest by fixed and camera-equipped unmanned mobile vehicle coordination from the perspective of a centralized computing device, while method 500 describes a similar process for improving object recognition certainty of objects compared to objects of interest by fixed and camera-equipped unmanned mobile vehicle coordination from the perspective of a distributed wireless network of devices.

Method 400 begins at step 402 where a computing device communicatively coupled to a fixed camera receives a first point of view (POV) image and/or video of a first object from the fixed camera. The fixed camera may be, for example, a fixed camera coupled to a utility pole, a camera equipped to an ATM machine, a camera coupled to a traffic light, or some other fixed camera having a field of view that covers the first object.

At step 404, the computing device compares the first POV of the first object to an object of interest stored at the computing device or stored remote from the computing device but made accessible to the computing device. For example, the stored object of interest may be an image of a person of interest (inside or outside of a vehicle and such as a facial capture of the person of interest, or particular characteristics such as a tattoo or scar of the person of interest) or a vehicle (such as an image of the vehicle, a particular make and model of the vehicle, or a particular license plate of the vehicle), or may be a image of some other object (such as a particular type of firearm, a particular word or phrase on a bumper sticker, a particular hat worn by a person, a particular warning sticker associated with a flammable, explosive, or biological substance, and/or other types objects of interest).

The computing device then determines whether the first POV image and/or video of the first object matches an object of interest with a first determined level of certainty within a predetermined level of certainty range. As set forth above, this predetermined level of certainty range extends lower than absolute certainty (e.g., less than 100%, less than 90%, or less than 80%, 70%, or 60%) and higher than absolute uncertainty (e.g., greater than 0%, greater than 10%, greater than 20%, or greater than 30% or 40%), and may vary based on an identity or category associated with the object of interest (e.g., a larger range but potentially shifted lower overall, such as 10% to 60% certainty, for more serious or dangerous objects of interest such as persons convicted of felonies or graphics associated with biohazards and a smaller range but potentially shifted higher overall, such as 40 to 70% for less serious or dangerous objects of interest, such as persons convicted of misdemeanors or graphics associated with criminal organizations). For first determined levels of certainty above the upper end of the predetermined level of certainty range, such as 60% for more serious or dangerous objects of interest, for example, a responder may always be dispatched and the disclosed processes for confirming certainty not executed.

Various text, image, and/or object recognition algorithms may be used to match the captured first POV of the first object to the stored object of interest, including but not limited to geometric hashing, edge detection, scale-invariant feature transform (SIFT), speeded-up robust features (SURF), neural networks, deep learning, genetic, optical character recognition (OCR), gradient-based and derivative-based matching approaches, Viola-Jones algorithm, template matching, or image segmentation and blob analysis. The certainty of a match is provided by the matching algorithm and sets forth a numerical representation of how certain, or how confident, the algorithm is that the first object (from the first captured image and/or video of the first POV) matches the object of interest. This numerical representation may be a percentage value (between 0 and 100%, as set forth above), a decimal value (between 0 and 1), or some other predetermined ranged numerical value having an upper and lower bound. One or more additional points of view of the first object may be necessary for the algorithm to become more certain, or confident, that there is a match between the first object and the object of interest stored in a text, image, or object database. If the match at step 404 does not fall into the predetermined level of certainty range, processing proceeds back to step 404 again and the first object is compared to another stored object of interest. Once all objects of interest have been compared, method 400 may stop and the system may ultimately refrain from dispatching a first responder or otherwise taking any action on the first object.

On the other hand, and assuming that the first POV of the first object is matched against a stored object of interest at a first determined level of certainty in the predetermined level of certainty range, processing proceeds to step 406, where the computing device identifies one or more camera-equipped unmanned mobile vehicles in a direction of travel of the first object. The computing device may maintain a pre-determined list of camera-equipped unmanned mobile vehicle locations, or may dynamically update a maintained list of camera-equipped unmanned mobile vehicle locations as they report their current locations. Each camera-equipped unmanned mobile vehicle in the list may be uniquely identified via a unique alpha-numeric identifier, and may also be associated with a status, e.g., whether it is available for dispatch, its battery power levels, its estimated flight times based on the remaining power level, imaging characteristics associated with the unmanned mobile vehicle's camera, and other information useful in determining, by the computing device, which one or more camera-equipped unmanned mobile vehicles to dispatch to intercept the first object for additional imaging purposes. For example, the computing device may select an available camera-equipped unmanned mobile vehicle from the list having a location closest to the fixed camera, a location closest to an expected intercept point of the first object (or the vehicle carrying the first object) considering speed, direction, street lane, and/or cartographic information of streets and/or other paths on which the first object or vehicle is traveling, a camera-equipped unmanned mobile vehicle having a highest imaging parameter relative to the first object (e.g., preferring a better shutter speed if the first object/vehicle is traveling at a high rate of speed, preferring a higher resolution if the first object/vehicle is traveling at a low/nominal rate of speed under, for example, 25 or 35 miles per hour, preferring a higher zoom capability and/or optical image stabilization capability if the object of interest is relatively small, for example, less than 25 $cm^2$ in area or 25 $cm^3$ in volume, preferring an air-based mobile vehicle or land-based mobile vehicle dependent upon an altitude at which the first object exists and a second POV desired of the first object, or some combination of the foregoing). Parameters such as the foregoing may be pre-populated in the list maintained at the computing device or made accessible to the computing device, or may be transmitted to the computing device by each respective camera-equipped unmanned mobile vehicle and stored in the list. In some instances, the computing device may identify only a single best or most capable camera-equipped unmanned mobile vehicle at step 406, while in other embodiments, the computing device may identify two or more camera-equipped unmanned mobile vehicles at step 406 using one or more of the parameters set forth above.

Once the computing device has identified one or more preferred camera-equipped unmanned mobile vehicles at step 406, at step 408, it transmits, via a transceiver, a dispatch instruction and intercept information to the identified one or more camera-equipped unmanned mobile vehicles. The dispatch instruction and intercept information may be transmitted to the one or more preferred camera-equipped unmanned mobile vehicles via a RAN such as RAN 152 and infrastructure wireless links 140, 144 set forth in FIG. 1, or via direct-mode wireless links such as wireless link 142 set forth in FIG. 1. In still other examples, a wired link may be used to communicatively couple the computing device to the identified one or more preferred camera-equipped unmanned mobile vehicles, ultimately reaching the identified one or more preferred camera-equipped unmanned mobile vehicles via a near-field or wired coupling at a charging point at which the mobile vehicle is resting.

The dispatch instruction may be incorporated into the intercept information message, or may be sent as a separate message requesting that the receiving identified one or more preferred camera-equipped unmanned mobile vehicles take action to intercept the first object and take a second POV image and/or video of the first object to improve a certainty that the first object matches the object of interest, alone or in combination with the first POV of the first captured object from the fixed camera obtained at step 402.

The intercept information includes information sufficient for the identified one or more preferred camera-equipped unmanned mobile vehicles to identify the first object and take a second POV image/video capture of the first object. For example, the intercept information may include a copy of the captured first POV image and/or video of the first object taken by the fixed camera at step 402, which the identified one or more preferred camera-equipped unmanned mobile vehicles may use to monitor an area around them for the first object approaching it. In other embodiments, the intercept information may include information identifying a vehicle in which the first object is traveling in (which may or may not be included in the first POV image and/or video provided by the fixed camera, but which may have been separately imaged and/or processed by the fixed camera), such as a make and model of a vehicle on or in which the first object is traveling or a license plate of a vehicle on or in which the first object is traveling. Additionally or alternatively, the intercept information may contain information identifying a direction and/or speed of travel of the first object or vehicle on or in which the first object is traveling, may also include a lane out of a plurality of available lanes in which the vehicle is traveling, and may also include a status of a turn indicator such as a turn signal or hand gesture indicating a pending turn of the vehicle. Still further, the intercept information may include a location of the fixed camera and a time at which the first object was captured at the fixed camera. Other information could be included as well. This information may then be used by the receiving identified one or more preferred camera-equipped unmanned mobile vehicles to more quickly and accurately locate the first object.

Figure 6:
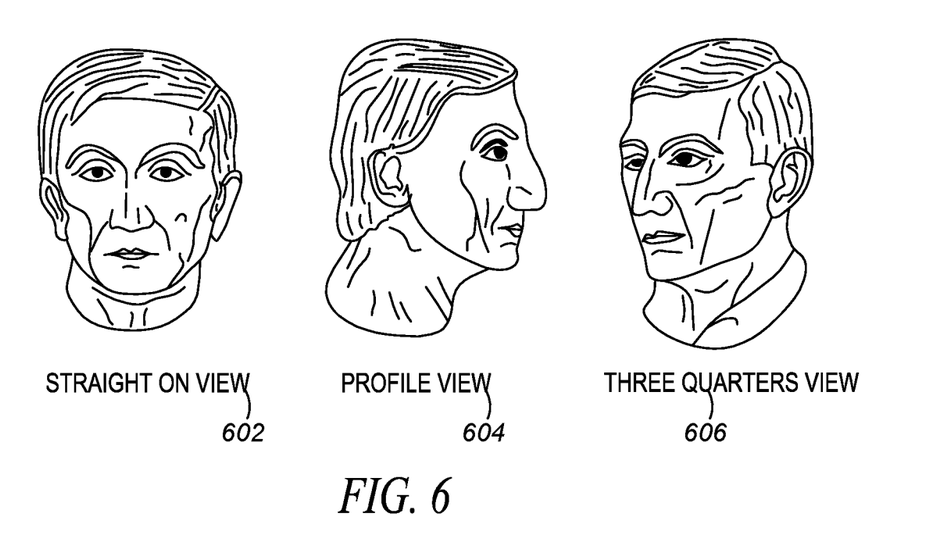
FIG. 6 is a diagram illustrating several different possible points of view for capturing and comparing a person's face as a captured object for comparison to another captured person's face as an object of interest, in accordance with an embodiment.

In some embodiments the dispatch instruction or intercept information may also include information sufficient to identify a desired POV of the first object that would maximize an increase in certainty. For example, and as set forth in FIG. 6, where the first object is a face of a driver in a vehicle captured by the fixed camera in a first POV of a profile view 604 or a three-quarters view 606, either due to obstructions, imaging characteristics of the fixed camera, or the characteristics of the profile view/three-quarters view itself, a certainty of a match between the first POV profile view 604/three-quarters view 606 and a stored object of interest (perhaps a stored straight on view 602 of a particular suspect wanted on a warrant or for some other reason) may be 60% and may fall in a predetermined level of certainty range where it is not entirely certain that there is a match but it is also not entirely certain that there is not a match. Accordingly, the computing device may identify as a function of the first POV already provided, a particular desired POV that is one or both of an improvement in POV compared to the first POV and is complementary to the first POV so as to maximize a second level of certainty, such as the straight-on-view 602 of the first object that the computing device desires to receive from the identified one or more preferred camera-equipped unmanned mobile vehicles, and may transmit such a desire or instruction in the dispatch instruction or intercept information. The receiving identified one or more preferred camera-equipped unmanned mobile vehicles may then use this additional information to position itself or themselves to obtain the particularly desired POV of the first object.

At step 410, the computing device receives, in response to causing the transmission of the dispatch instruction and intercept information to the identified one or more preferred camera-equipped unmanned mobile vehicles at step 408, a captured second POV image and/or video of the first object. The second POV image and/or video may be taken from a same or different POV than the first POV image and/or video of the first object, may be taken at a same or different distance than the first POV image and/or video, or may be taken using a camera having different, preferably higher, imaging parameters than the first POV image and/or video. In some instances where the dispatch instruction and intercept information were transmitted to multiple preferred camera-equipped unmanned mobile vehicles at step 408, multiple captured second POV images and/or video of the first object may be received by the computing device at step 410.

At step 412, the captured second POV image and/or video (or images and/or videos if multiple) is fed back in to the same or similar object identification/matching algorithm as set forth in step 404 above, accompanying the first POV image and/or video or not, and a second level of certainty that the first object matches the object of interest from step 404 is determined. In most instances, the second determined level of certainty will be different than the first determined level of certainty, and preferably, will be significantly greater than the first determined level of certainty (such as twenty percentage points or more greater that there is a match and in some embodiments greater than the upper range of the predetermined level of certainty range, meaning the second POV of the first object helped confirm that the first object matches the object of interest) or significantly less than the first determined level of certainty (such as twenty percentage points or more lower that there is a match, and in some embodiments less than the lower range of the predetermined level of certainty range, meaning the second POV of the first object helped confirm that the first object does not match the object of interest).

In some embodiments, and as a result of finding a match with a higher second level of certainty greater than the upper range of the predetermined level of certainty range, such as greater than 60%, 70%, 80%, or 90%, the computing device may cause an alert to be transmitted to one of a dispatch console and a mobile computing device determined to be located in an area within a threshold distance, such as 0.5, 1, or 2 miles, of the one or more identified camera-equipped unmanned mobile vehicles. In some embodiments, the alert may include the captured first and/or second POV images and/or video, or links thereto, of the first object and/or one or both of the determined first and second levels of certainty. The alert may further include a current location (or locations) of the one or more identified camera-equipped unmanned mobile vehicles if they are still tracking the first object and/or locations of the fixed camera and the one or more identified camera-equipped unmanned mobile vehicles when the first and second POV images and/or videos were taken. In still further examples, a live video stream (or streams) from the one or more identified camera-equipped unmanned mobile vehicles of the first object (assuming the first object is still being tracked) may be provided subsequent to the alert or in response to a receiving device activating a link in the alert requesting such a live video stream.

The type of alert provided may depend on one or both of the second level of certainty and an identity or category associated with the object of interest (e.g., a more noticeable alert such as a haptic alert and/or a flashing full-screen visual alert for more serious or dangerous objects of interest such as persons convicted of felonies or graphics associated with biohazards and a more subtle alert such as an audio tone or text message for less serious or dangerous objects of interest such as persons convicted of misdemeanors or graphics associated with known criminal organizations).

Turning now to FIG. 5, method 500 describes a similar process for improving object recognition certainty of objects compared to objects of interest by fixed and camera-equipped unmanned mobile vehicle coordination from the perspective of a distributed wireless network of devices. Where similar steps and processes are set forth in FIG. 5 relative to FIG. 4, the descriptions of FIG. 4 already set forth above are incorporated by reference without repeating ipsis verbis here.

Method 500 begins at step 502, similar to step 402 of FIG. 4, where a second computing device receives a first point of view (POV) of a second object from a fixed camera. The second computing device compares the first POV of the second object to an object of interest stored at the second computing device or stored remote from the second computing device but made accessible to the second computing device.

At step 504, and similar to step 404 of FIG. 4, the second computing device determines whether the first POV image and/or video of the second object matches an object of interest with a first determined level of certainty within a predetermined level of certainty range.

If the match at step 504 does not fall into the predetermined level of certainty range, processing proceeds back to step 504 again and the second object is compared to another stored object of interest. Once all objects of interest have been compared, method 500 may stop and the system may ultimately refrain from dispatching a first responder or otherwise taking any action on the second object.

On the other hand, and assuming that the first POV of the second object is matched against a stored object of interest at a first determined level of certainty in the predetermined level of certainty range, processing proceeds to step 508, similar to step 408 of FIG. 4, where the second computing device this time causes a broadcast, via a transceiver, of a dispatch instruction and intercept information to be wirelessly transmitted for receipt by one or more camera-equipped unmanned mobile vehicles in a vicinity (e.g., direct mode wireless transmit range) of the second computing device and/or transceiver. The dispatch instruction and intercept information may be formed in a manner, and contain a same or similar information, as that already set forth above with respect to step 408 of FIG. 4.

In some embodiments, the second computing device may rely upon the receiving one or more camera-equipped unmanned mobile vehicles to determine, individually or via additional wireless communications amongst themselves, which one or more of the camera-equipped unmanned mobile vehicles that receive the broadcast should actually be dispatched to intercept the second object and take second POV images and/or video of the second object. The individual or group determination may be made using similar decision trees and parameters as that already set forth above with respect to FIGS. 1 and 4.

In alternative embodiments, and after causing the wireless broadcast of the dispatch instruction and intercept information, the second computing device may wirelessly receive, via the transceiver from two or more camera-equipped unmanned mobile vehicles that received the broadcast(s), respective acknowledgments of receipt of the dispatch instruction and intercept information and including respective camera-equipped unmanned mobile vehicle parameter information, the camera-equipped unmanned mobile vehicle parameter information including one or more of location information, battery level information, flight capabilities (e.g., such as speed, acceleration, flight ceiling), and camera imaging parameter information. The second computing device may then use the respectively received camera-equipped unmanned mobile vehicle parameter information to identify a particular one of the two or more camera-equipped unmanned mobile vehicles for capturing the second POV image and/or video of the second object in a similar manner to that already set forth above (e.g., preferring one or more of a location closest to an expected intercept point of the first object, preferring imaging parameters of the mobile vehicle's camera, preferring a type of mobile vehicle, or some combination of the above). Once the particular one is identified, the second computing device may cause an additional electronic instruction to be broadcast or directly transmitted to the particular one of the two or more camera-equipped unmanned mobile vehicles further instructing the particular one of the two or more camera-equipped unmanned mobile vehicles to capture the second POV image and/or video of the second object. Other ones of the two or more camera-equipped unmanned mobile vehicles that don't receive the further instruction from the second computing device (or that receive the broadcast but determine that they were not chosen as the particular one or more camera-equipped unmanned mobile vehicles to intercept the second object) refrain from intercepting the second object for additional image and/or video capture. In some instances, the second computing device may identify only a single best or most capable particular one of the camera-equipped unmanned mobile vehicles, while in other embodiments, the second computing device may identify two or more camera-equipped unmanned mobile vehicles using one or more of the parameters set forth above.

At step 510, and somewhat similar to step 410 of FIG. 4, the second computing device wirelessly receives, in response to causing the broadcast of the dispatch instruction and intercept information to the one or more camera-equipped unmanned mobile vehicles at step 508, a captured second POV image and/or video of the first object. In some instances where multiple camera-equipped unmanned mobile vehicles received the broadcast at step 508 and captured a second POV of the second object, multiple captured second POV images and/or video of the second object may be received by the second computing device at step 510.

At step 512, and in a similar manner to step 412 of FIG. 4, the captured second POV image and/or video (or images and/or videos if multiple) is fed back in to the same or similar object identification/matching algorithm as set forth in step 504 above, accompanying the first POV image and/or video or not, and a second level of certainty that the second object matches the object of interest from step 504 is determined.

In some embodiments, and as a result of finding a match with a higher second level of certainty greater than the upper range of the predetermined level of certainty range, such as greater than 60%, 70%, 80%, or 90%, the second computing device may cause an alert to be transmitted to one of a dispatch console and a mobile computing device determined to be located in an area within a threshold distance, such as 0.5, 1, or 2 miles, of the one or more identified camera-equipped unmanned mobile vehicles. In some embodiments, the alert may include the captured first and/or second POV images and/or video, or links thereto, of the second object and/or one or both of the determined first and second levels of certainty. The alert may further include a current location (or locations) of the one or more identified camera-equipped unmanned mobile vehicles if they are still tracking the second object (and sending back location information to the second computing device) and/or locations of the fixed camera and the one or more identified camera-equipped unmanned mobile vehicles when the first and second POV images and/or videos were taken. In still further examples, a live video stream (or streams) from the one or more identified camera-equipped unmanned mobile vehicles of the second object (assuming the second object is still being tracked) may be provided subsequent to the alert or in response to a receiving device activating a link in the alert.

3. CONCLUSION

In accordance with the foregoing, an improved device, method, and system is disclosed for improving object recognition certainty of objects imaged by fixed cameras through intelligent collaboration and coordination between the fixed cameras and one or more identified camera-equipped unmanned mobile vehicles. As a result of the foregoing, false positives and false negatives can both be substantially reduced and/or eliminated, improving reliance on the imaging systems and reducing the number of unnecessarily dispatched officers or other types of responders to simply to confirm an initial low or mid level certainty match.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for fixed camera and unmanned mobile device collaboration to improve identification of an object of interest, the method comprising:
   receiving, at an electronic processing device from a fixed camera, a captured first point of view of a first captured object and determining, with a first level of certainty in a predetermined level of certainty range, that the captured first point of view of the first object matches a first stored object of interest;

causing, by the electronic processing device, a dispatch instruction and intercept information to be wirelessly broadcast for receipt by one or more camera-equipped unmanned mobile vehicles within broadcast range, the intercept information including the determined direction of travel of the first captured object, information sufficient to identify either the first captured object or a vehicle with which the first captured object is travelling, and information identifying a desired second point of view of the first captured object different from the first point of view;

wirelessly receiving, by the electronic processing device, via the one or more camera-equipped unmanned mobile vehicles, a captured second point of view of the first captured object; and using, by the electronic processing device, the captured second point of view of the first captured object to determine, with a second level of certainty, that the first captured object matches the stored object of interest.

2. The method of claim 1, further comprising using, by the electronic processing device, the captured first point of view of the first captured object and the captured second point of view of the first captured object to determine, with the second level of certainty, whether the first captured object matches the stored object of interest.

3. The method of claim 1, wherein the predetermined level of certainty range is less than 70%.

4. The method of claim 1, wherein the first stored object of interest is a person of interest, the first point of view is a side point of view of the person of interest, and the second point of view is a head-on point of view of the person of interest.

5. The method of claim 4, wherein the person of interest is travelling in a motor vehicle.

6. The method of claim 5, wherein the intercept information includes information sufficient to identify the motor vehicle at the one or more camera-equipped unmanned mobile vehicles.

7. The method of claim 6, wherein the intercept information further includes a particular driving lane out of a plurality of available driving lanes in the determined direction of travel that the motor vehicle was traveling in at the time of the captured first point of view.

8. The method of claim 7, further comprising, after causing the wireless broadcast of the dispatch instruction and intercept information but before wirelessly receiving the captured second point of view of the first captured object:

wirelessly receiving, from two or more camera-equipped unmanned mobile vehicles, respective acknowledgments of receipt of the dispatch instruction and intercept information and including respective camera-equipped unmanned mobile vehicle parameter information, the camera-equipped unmanned mobile vehicle parameter information including one or more of location information, battery level, flight capabilities, and camera imaging parameters; and identifying, by the electronic processing device and as a function of the respective camera-equipped unmanned mobile vehicle parameter information, a particular one of the two or more camera-equipped unmanned mobile vehicles for capturing the second point of the view of the first captured object, and transmitting, by the electronic processing device, an electronic instruction to the particular one of the two or more camera-equipped unmanned mobile vehicles to capture the second point of the view of the first captured object.

9. The method of claim 8, wherein the camera-equipped unmanned mobile vehicle parameter information includes location information and wherein identifying the particular one of the two or more camera-equipped unmanned mobile vehicles for capturing the second point of the view of the first captured object comprises comparing location information from each received camera-equipped unmanned mobile vehicle parameter information with the determined direction of travel of the first captured object and a plurality of identified possible navigational paths using cartographic navigational information retrieved from a cartographic database.

10. The method of claim 9, further comprising using, by the electronic processing device, the particular driving lane included in the intercept information to select a subset of the plurality of identified possible navigational paths for use in identifying the particular one of the two or more camera-equipped unmanned mobile vehicles for capturing the second point of the view of the first captured object.

11. The method of claim 1, wherein the desired second point of view is chosen to maximize the second level of certainty, and the second level of certainty is higher than the first level of certainty.

12. The method of claim 1, wherein the predetermined level of certainty range is greater than a minimum non-zero, positive threshold level of certainty.

13. The method of claim 12, wherein the minimum non-zero, positive threshold level of certainty is greater than 15%.

14. The method of claim 12, wherein the predetermined level of certainty range is less than a maximum threshold level of certainty that itself is less than a 100% level of certainty.

15. The method of claim 14, wherein the maximum threshold level of certainty is less than 85%.

16. The method of claim 1, wherein the fixed camera has a low relative image taking parameter that causes the first level of certainty to be lower than desired, and wherein the one or more identified camera-equipped unmanned mobile vehicles has a higher relative image taking parameter that causes the second level of certainty to be higher than the first level of certainty.

17. The method of claim 1, wherein the one or more identified camera-equipped unmanned mobile vehicles comprise one or both of aerial mobile vehicles and land-based motor vehicles.

18. The method of claim 1, the method further comprising, when the second level of certainty is above a secondary threshold level of certainty, causing, by the electronic processing device, an alert to be transmitted to one of a dispatch console and a mobile computing device determined to be located in an area within a threshold distance of the one or more identified camera-equipped unmanned mobile vehicles indicating that a match has been found at or above the secondary threshold level of certainty.

19. The method of claim 18, wherein the alert includes the captured first and second points of view, or links thereto, and one or both of the first and second levels of certainty.

20. An electronic processing device for fixed camera and unmanned mobile device collaboration to improve identification of an object of interest, the device comprising:

a fixed-camera interface;
an unmanned mobile device interface;
a memory;
a transceiver; and one or more processors configured to:
- receive, via the fixed-camera interface and from a fixed camera, a captured first point of view of a first captured object and determining, with a first level of certainty in a predetermined level of certainty range, that the captured first point of view of the first object matches a first stored object of interest;
- causing a dispatch instruction and intercept information to be wirelessly broadcast, via the transceiver, for receipt by one or more camera-equipped unmanned mobile vehicles within broadcast range, the intercept information including the determined direction of travel of the first captured object, information sufficient to identify either the first captured object or a vehicle with which the first captured object is travelling, and information identifying a desired second point of view of the first captured object different from the first point of view;
- wirelessly receive, via the transceiver and from the one or more camera-equipped unmanned mobile vehicles, a captured second point of view of the first captured object; and
- use the captured second point of view of the first captured object to determine, with a second level of certainty, that the first captured object matches the stored object of interest.

* * * * *